United States Patent
Ketharaju (10) Patent No.: US 12,333,006 B1
(45) Date of Patent: Jun. 17, 2025

(54) SYSTEMS AND METHODS FOR THREAT MITIGATION USING ARTIFICIAL INTELLIGENCE

(71) Applicant: Wells Fargo Bank, N.A., San Francisco, CA (US)

(72) Inventor: Rameshchandra Bhaskar Ketharaju, Hyderabad (IN)

(73) Assignee: Wells Fargo Bank, N.A., San Francisco, CA (US)

(*) Notice: Subject to any disclaimer, the term of this patent is extended or adjusted under 35 U.S.C. 154(b) by 199 days.

(21) Appl. No.: 18/158,142

(22) Filed: Jan. 23, 2023

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......... G06F 21/554; G06F 2221/034
See application file for complete search history.

(56) References Cited

U.S. PATENT DOCUMENTS

| | | | |
|---|---|---|---|
| 2021/0097260 A1 | 4/2021 | Verma et al. | |
| 2021/0209388 A1* | 7/2021 | Ciftci | G06N 3/045 |
| 2021/0279804 A1* | 9/2021 | Shakfeh | G16H 50/20 |
| 2022/0405401 A1* | 12/2022 | McCarthy | G06F 21/577 |

OTHER PUBLICATIONS

Maayan, Gilad David, "How Brand Protection Can Address the Risk of GAN Deepfakes", Oct. 13, 2022, Web Page <https://securityboulevard.com/2022/10/how-brand-protection-can-address-the-risk-of-gan-deepfakes/> (9 Pages).
"What are Deepfakes?", Vastmindz, Web Page <https://vastmindz.com/our-solution/deepfake-prevention/>, retrieved from Internet Archive Wayback Machine <https://web.archive.org/web/20221126163932/https://vastmindz.com/our-solution/deepfake-prevention/> on Jan. 23, 2022 (4 Pages).
Poremba, Sue, "How to Protect Against Deepfake Attacks and Extortion", SecurityIntelligence, Web Page <https://securityintelligence.com/articles/how-protect-against-deepfake-attacks-extortion/> (7 Pages).
Yang, Chaofei, et al., "Defending against gan-based deepfake attacks via transformation-aware adversarial faces." 2021 International Joint Conference on Neural Networks (IJCNN). IEEE, 2021. (14 Pages).

* cited by examiner

*Primary Examiner* — Cheng-Feng Huang
(74) *Attorney, Agent, or Firm* — K&L Gates LLP (57) ABSTRACT

Systems, apparatuses, methods, and computer program products are disclosed for mitigating threats using artificial intelligence. An example method includes: obtaining, via communications hardware of a threat manager, a piece of data; determining, by a threat identification engine of the threat manager, that the piece of data is a threat; and causing, by a remediation engine of the threat manager and in response to the determination, execution of a threat remediation action. The threat remediation action comprises at least one of: publishing an emergency remediation statement addressing the threat, transmitting a takedown request to remove the threat from a threat source, or ignoring the threat.

20 Claims, 3 Drawing Sheets

SYSTEMS AND METHODS FOR THREAT MITIGATION USING ARTIFICIAL INTELLIGENCE

BACKGROUND

Computing devices may provide various services. For example, computing devices may allow individuals and entities to communicate and share information with other individuals and entities.

BRIEF SUMMARY

Improvements in and ease of access to artificial intelligence (AI) and machine learning technologies have resulted in an increase of online/cyber-related threats such as deepfake-related attacks and scams. In particular, there has been an increase in deepfake scams used in conjunction with distributed denial-of-service (DDoS) attacks to disrupt an entity's (e.g., a company's) operations.

Traditionally it has already been difficult to identify such online/cyber-related threats that utilize deepfake technology. Recent advancements in AI technologies (e.g., ChatGPT, Lensa, or the like) have made it even more difficult to distinguish between real and deepfake/AI generated content. Furthermore, because such online/cyber-related threats (herein referred to simply as "threats") occur at such high frequencies (e.g., hundreds to tens of thousands of attack per minute), it is impossible for a human user to immediately respond to (e.g., identify, assess, and mitigate) and intervene with each and every occurring threat.

In contrast to conventional methods for mitigating such threats, example embodiments described herein provide methods and systems for mitigating threats using AI. In particular, one or more embodiments may be configured to automatically identify and assess threats (e.g., using trained models such as AI models, unsupervised models utilizing clustering techniques, or the like). Once a threat is identified and assessed, additional AI techniques such as generative artificial intelligence (AI) techniques may be used to automatically and preemptively (e.g., without any direct human intervention) apply emergency actions to mitigate and reduce any potential (or actual) damage that could be (or has been) caused by the threat until a human user is available to intervene. These features not only advantageously resolve the existing issues of not having enough human resources to actively respond to each threat, but also directly improves the technical fields of cybersecurity and digital communications (e.g., user-to-user-communications, user-to-public communications using content sharing platforms, or the like) where such threats are known to be a significant concern.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
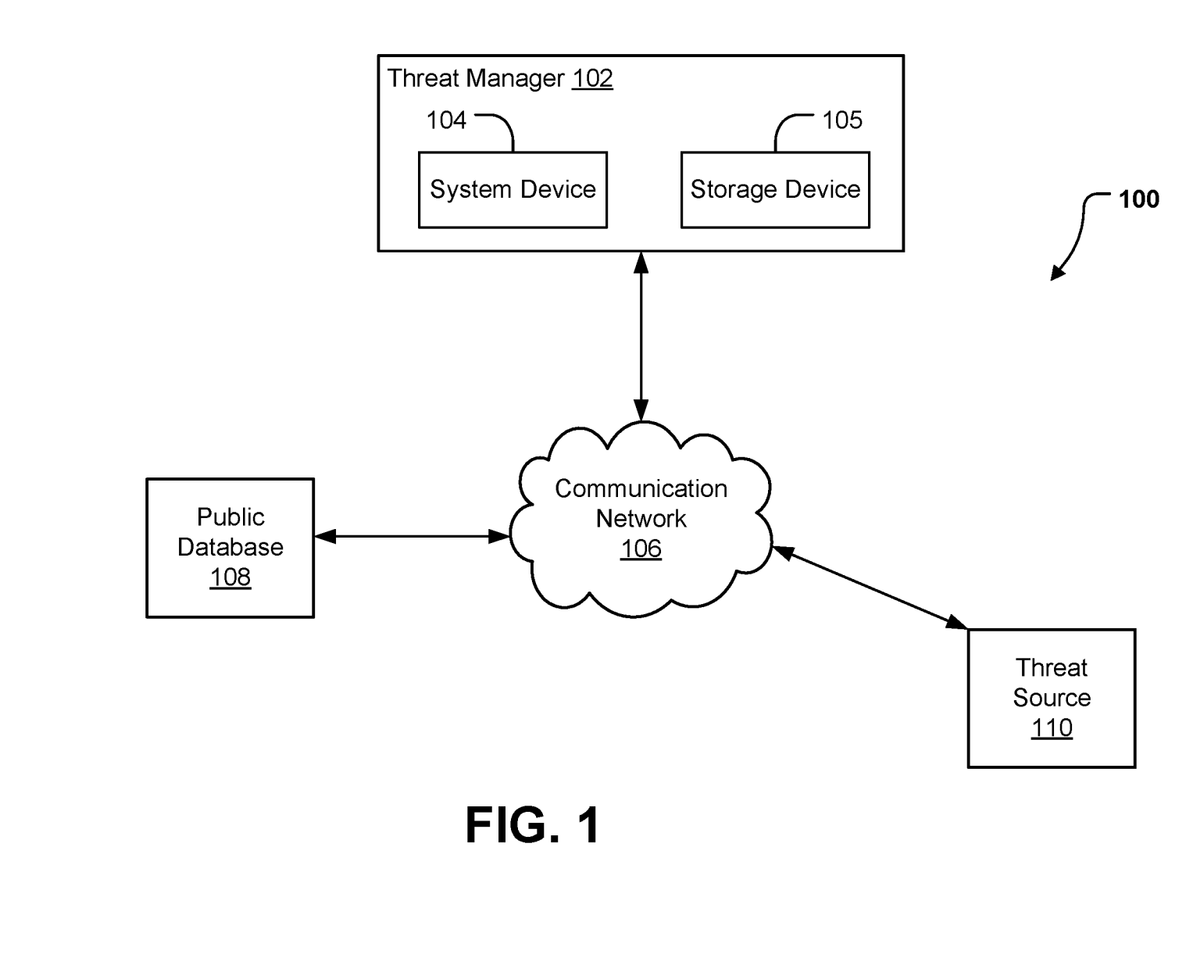
FIG. 1 illustrates a system in which some example embodiments may be used.

Example embodiments described herein may be implemented using any of a variety of computing devices or servers. To this end, FIG. 1 illustrates an example system 100 within which various embodiments may operate. As illustrated in FIG. 1, the system may include a threat manager 102 that may receive and/or transmit information via communications network 106 (e.g., the Internet) with any number of other devices, such as a public data source 108 and threat source 110. In some embodiments, users may directly interact with the threat manager 102 (e.g., via communications hardware 206 of threat manager 102, which is discussed in more detail below in reference to FIG. 2), in which case a separate computing device connected to the threat manager 102 (e.g., in an instance where the threat manager is a server disposed at a location that is not physically accessible to the users of the server) may not be utilized. Whether by way of direct interaction or via a separate computing device, a user may communicate with, operate, control, modify, or otherwise interact with the threat manager 102 to perform the various functions and achieve the various benefits described herein.

In some embodiments, threat manager 102 may be implemented as one or more computing devices or servers, which may be composed of a series of components. Particular components of the threat manager are described in greater detail below with reference to apparatus 200 in FIG. 2.

In some embodiments, the public data source 108 be embodied by any computing devices known in the art configured with memory and/or storage (e.g., one or more direct-attached storage (DAS) devices (such as hard drives, solid-state drives, optical disc drives, or the like) or may alternatively comprise one or more Network Attached Storage (NAS) devices independently connected to a communications network (e.g., communications network 106)) storing public data (e.g., data accessible to the public via the Internet) that can be mined (e.g., retrieved) by other computing devices (e.g., threat manager 102) connected to the communications network 106. Although only a single one of the public data source 108 is shown in FIG. 1, some embodiments of the system 100 may include multiple ones of the public data source 108 (e.g., multiple public databases). In an instance where there are multiple ones of the public data source 108, each of the public data sources need not themselves be independent devices, but may be peripheral devices communicatively coupled to other computing devices.

In some embodiments, the threat source 110 may be embodied by any computing devices known in the art. Although only a single one of the threat source 110 is shown in FIG. 1, some embodiments of the system 100 may include multiple ones of the threat source 110 (e.g., multiple threat sources). In an instance where there are multiple ones of the threat source 110, each of the threat sources need not themselves be independent devices, but may be peripheral devices communicatively coupled to other computing devices.

Example Implementing Apparatuses

Figure 2:
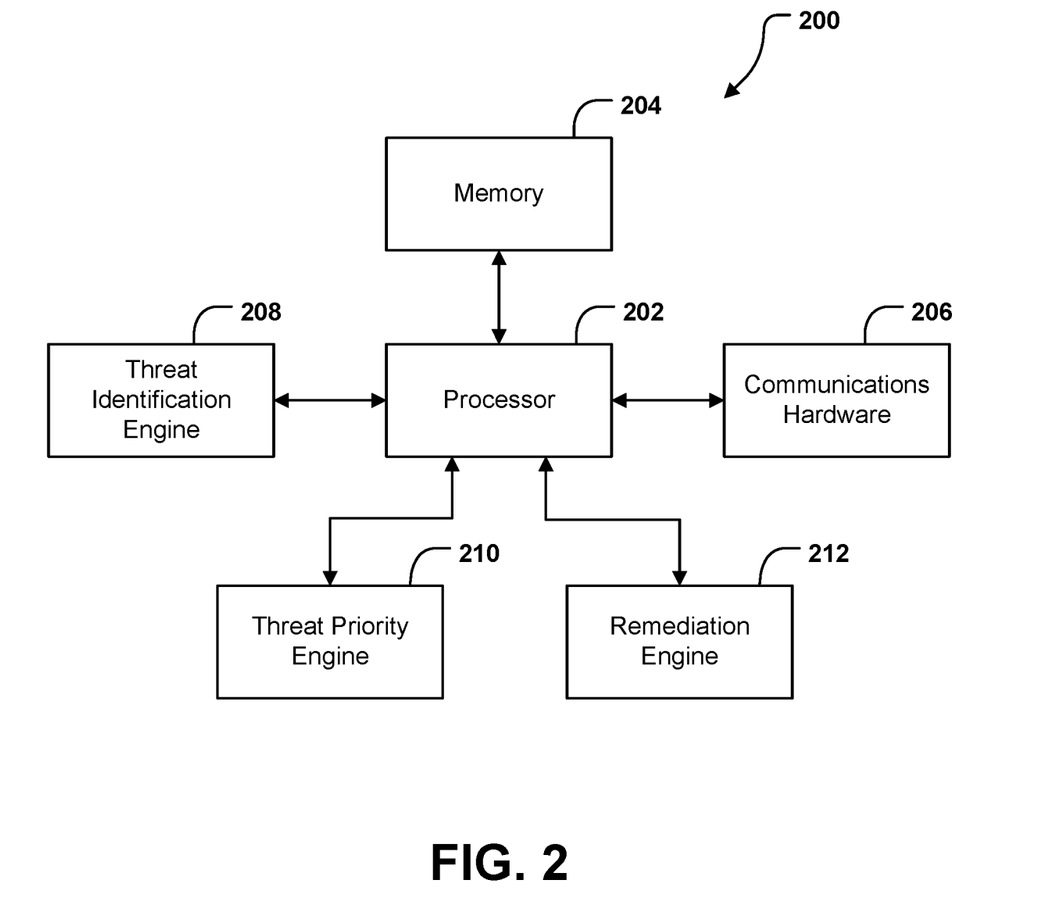
FIG. 2 illustrates a schematic block diagram of example circuitry embodying a device that may perform various operations in accordance with some example embodiments described herein.

The threat manager 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIG. 3. As illustrated in FIG. 2, the apparatus 200 may include processor 202, memory 204, communications hardware 206, threat identification engine 208, threat priority engine 210, and remediation engine 212, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a threat identification engine 208 that is configured to identify one or more threats (namely, online/cyber-related threats). The threat identification engine 208 may utilize processor 202, memory 204, or any other hardware component included in the apparatus 200 to perform these operations, as described in connection with FIG. 3 below. The threat identification engine 208 may further utilize communications hardware 206 to gather data from a variety of sources (e.g., public data source 108, as shown in FIG. 1), and/or exchange data with a user, and in some embodiments may utilize processor 202 and/or memory 204 to identify the one or more threats (namely, online/cyber-related threats).

In addition, the apparatus 200 further comprises a threat priority engine 210 that is configured to determine (e.g., calculate) and assign each identified threat with a weight (e.g., a value indicative of a relative importance of each identified threat). Details of the assigned weight is described below in reference to FIG. 3. The threat priority engine 210 may utilize processor 202, memory 204, or any other hardware component included in the apparatus 200 to perform these operations, as described in connection with FIG. 3 below. The threat priority engine 210 may further utilize communications hardware 206 to gather data from a variety of sources (e.g., public data source 108, as shown in FIG. 1), and/or exchange data with a user, and in some embodiments may utilize processor 202 and/or memory 204 to determine and assign each identified threat with the weight.

Further, the apparatus 200 further comprises a remediation engine 212 that is configured to execute one or more threat remediation actions, which are described in more detail below in reference to FIG. 3. The remediation engine 212 may utilize processor 202, memory 204, or any other hardware component included in the apparatus 200 to perform these operations, as described in connection with FIG. 3 below. The remediation engine 212 may further utilize communications hardware 206 to gather data from a variety of sources (e.g., public data source 108, as shown in FIG. 1), and/or exchange data with a user, and in some embodiments may utilize processor 202 and/or memory 204 to execute one or more threat remediation actions.

Although components 202-212 are described in part using functional language, it will be understood that the particular implementations necessarily include the use of particular hardware. It should also be understood that certain of these components 202-212 may include similar or common hardware. For example, the threat identification engine 208, threat priority engine 210, and remediation engine 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the threat identification engine 208, threat priority engine 210, and remediation engine 212 may leverage processor 202, memory 204, or communications hardware 206 as described above, it will be understood that any of the threat identification engine 208, threat priority engine 210, and remediation engine 212 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that the threat identification engine 208, threat priority engine 210, and remediation engine 212 comprise particular machinery designed for performing the functions described herein in connection with such elements of apparatus 200.

In some embodiments, various components of the apparatuses 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of flowcharts.

Example Operations

Figure 3:
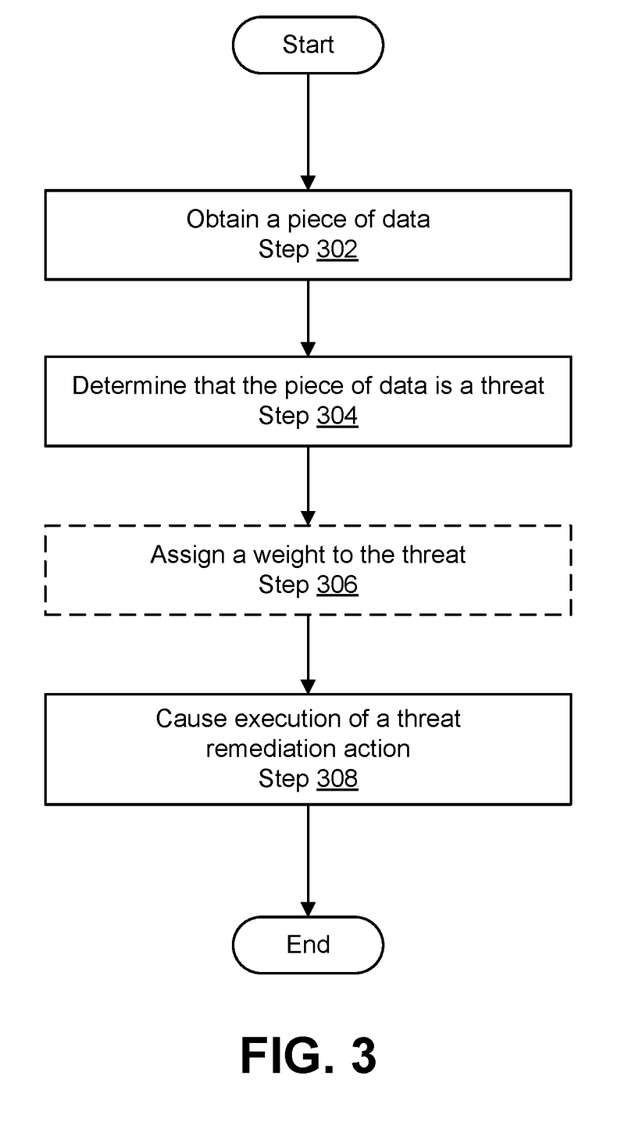
FIG. 3 illustrates an example flowchart for mitigating threats using artificial intelligence, in accordance with some example embodiments described herein.

Turning to FIG. 3, an example flowchart is illustrated that contain example operations implemented by example embodiments described herein. The operations illustrated in FIG. 3 may, for example, be performed by the threat manager 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, threat identification engine 208, threat priority engine 210, remediation engine 212, and/or any combination thereof. It will be understood that user interaction with the threat manager 102 may occur directly via communications hardware 206, or may instead be facilitated by a separate computing device (not shown in the figures) that may have similar or equivalent physical componentry facilitating such user interaction.

Turning first to FIG. 3, example operations are shown for mitigating threats using artificial intelligence.

As shown by operation 302, the apparatus 200 includes means, such as processor 202, memory 204, communications hardware 206, threat identification engine 208, or the like, for obtaining a piece of data. In one or more embodiments, the piece of data may be any type of data (e.g., textual, audio, visual, or the like) of any size that can be obtained from (e.g., found on) one or more online sources (e.g., Internet sources such as websites and/or computing devices connected to the apparatus 200 including the apparatus 200). For example, the piece of data may be, but is not limited to: a video file, an audio file, a public and/or private blog post, a website including all or a portion of its content, an email, a document, or the like.

In some embodiments, the piece of data may be obtained from any source (e.g., threat source 110 as shown in FIG. 1). For example, the piece of data may be provided by a user (e.g., a user and/or administrator of the apparatus 200) using the input-output circuitry of communications hardware 206. As another example, obtaining the piece of data may include retrieving and/or receiving a copy of the actual piece of data (e.g., through the transmission of the piece of data by the threat source 110 to apparatus 200, through the downloading and/or through taking a screenshot of the piece of data from the threat source by the apparatus 200, or through other similar methods). Alternatively, or in addition to the above, obtaining the piece of data may not involve retrieving and/or receiving the actual piece of data. Instead, obtaining the piece of data may involve the apparatus 200 (namely, the threat identification engine 208) being aware of the existence of the piece of data. For example, the piece of data may be a video uploaded to a public video-sharing/streaming website. The threat identification engine 208 may be aware of the video's existence on the public video-sharing/streaming website but does not initiate any protocols to retrieve the video from the public video-sharing/streaming website.

In some embodiments, to be able to be aware of the existence of the piece of data, the threat identification engine may be configured to monitor (e.g., using known online monitoring techniques) one or more online sources (e.g., the threat source 110 as shown in FIG. 1). The one or more online sources may be sources from which previous threats have been detected, retrieved, and/or received and/or new sources from which there is a possible risk of a threat. In some embodiments, the one or more online sources may be provided to the threat identification engine 208 by a user (e.g., a user and/or administrator of the apparatus 200). The threat identification engine 208 may also be configured to automatically identify and add new online sources to the one or more online sources that it is already monitoring. Additional details regarding how the identification engine can automatically identify and add new online sources is discussed below in reference to Operation 304.

In some embodiments, the threat identification engine 208 may be configured to store all of the online sources in a known threat source database (e.g., a structured set of data held in a computer in the form of a list, table, or other similar organizational structure). The threat source database may be stored and continuously updated by the threat identification engine in memory 204 of the apparatus 200. As one example, a threat source may be a third-party content-sharing website.

As shown by operation 304, the apparatus 200 includes means, such as processor 202, memory 204, threat identification engine 208, or the like for determining whether a piece of data (e.g., the piece of data obtained in Operation 302) is a threat (namely, an online/cyber-related threat).

In some embodiments, the threat identification engine 208 may be configured to include one or more self-learning computing models (e.g., machine learning models using labeled training data, unsupervised models utilizing clustering techniques, or the like). The self-learning computing models may be trained using collected content (e.g., image, photos, videos, texts, blog posts, etc.) such that the self-learning computing models may identify (e.g., through making inferences) content indicative of a threat (e.g., deepfake data, scam related data, or the like).

In some embodiments, the content used to train the self-learning computing models may be manually provided by a user (a user and/or administrator of the apparatus 200). Additionally or alternatively, in some embodiments, the content used to train the self-learning computing models may also be collected by the threat identification engine 208 (e.g., through using components of communications hardware 206) by mining one or more public sources (e.g., public data source 108). Such public sources mined by the threat identification engine 208 may be any source accessible by the threat identification engine 208 using the Internet (e.g., communications network 106 as shown in FIG. 1) including the above-discussed one or more online sources stored in the threat source database.

For example, the threat identification engine 208 may mine the public sources to collect media content (namely, media content that contains one or more portions of known deepfake data). The collected media content may then be filtered based on one or more predetermined rules to retain only media content of interest for training the initial modeling component (e.g., this component may be trained based specific rules set by an entity and/or an individual to suit the specific entity and/or individual's needs). For example, assume that the entity is Wells Fargo Bank, the predetermined rules may be set to retain only content associated with Wells Fargo including, but not limited to: content including the Wells Fargo logo, content by senior leaders at Wells Fargo, content tagging the term "Wells Fargo", regulatory content, or the like.

In some embodiments, the threat identification engine 208 may train the self-learning computing models using the retained media content of interest to identity deepfake content (e.g., the threat) that may be used in a deepfake-related attacks and/or scams (e.g., a deepfake image and/or posting that is likely to have a negative impact on (e.g., have an adverse effect on/is adverse to) an entity such as Wells Fargo, whether by indirectly causing the entity's servers to overload (e.g., via indirect DDoS attacks), by tarnishing a corporate brand of the entity with one or more false allegations, or the like). In some embodiments, the deepfake content may be identified by, for example: external monitoring (e.g., monitoring content in a network environment external to the entity's internal network, analyzing received and/or retrieved ones of the deepfake content, or the like.

In some embodiments, as the self-learning computing models is trained with more and more collected (and or manually provided) content, the self-learning computing models will be able to make more accurate inferences to more accurately determine whether a piece of data (and/or whether a public source) may by (or may include a threat). Said another way, the self-learning computing models are trained to more accurately identify similarities between media content (namely, media content containing deepfake content), which increases the likelihood (e.g., accuracy) of the self-learning computing models being able to identity deepfake content.

In some embodiments, the trained self-learning computing models of the threat identification engine 208 may generate one or more threat fingerprints. Each threat fingerprint may be generated using information (e.g., patterns, impressions, marks, or the like) parsed from the collected content, and subsequently be used to identify threats using such information. For example, if a series of collected deepfake content all include a similar pattern, this similar pattern will be used to generate a threat fingerprint. The generated threat fingerprint may then be used to identify other potential deepfake content on the Internet (or received content) by scanning these online (or received) contents to determine whether they also include the same pattern indicated in the threat fingerprint. Said another way, substantial similarities (that are used to generate the one or more threat fingerprints) between media content and a known deepfakes increase the likelihood that these media content also contain deepfake content.

In some embodiments, in addition to analyzing a content of the piece of the data, other elements of the piece of data may be analyzed (e.g., by the threat identification engine 208 using the trained self-learning computing models) to determine whether the piece of data is a threat. For example, a source of the piece of data (e.g., an internet protocol (IP) of the threat source 110 in FIG. 1) may be analyzed (e.g., through parsing a data packet header of the piece of data). More specifically, certain IPs (e.g., certain IPs of certain countries, for example, Russia) may indicate a higher likelihood that the piece of data could be (or could include a threat). As another example, the piece of data may be analyzed (e.g., through parsing the data packet header) to determine how many hops (e.g., how many routers, gateways, or the like) the piece of data took to reach the apparatus 200. As yet another example, the piece of data may be analyzed to determine whether any information included in the piece of data (e.g., information included in the data packet header) has been masked. Other factors not listed above that are known to be associated with risky and/or illicit activity (e.g., internet fraud and scams) may also be used to evaluate whether the piece of data is a threat without departing from the scope of one or more embodiments disclosed herein.

As shown by operation 306, the apparatus 200 includes means, such as processor 202, memory 204, threat priority engine 210, or the like for assigning a weight to a threat (e.g., a threat identified in Operation 304).

In some embodiments, the threat priority engine 210 may utilize a weighting component to apply a weight to each threat (e.g., to each type of deepfake content) based on the nature of the threat's potential (or actual) negative impact. For example, threats including content (e.g., deepfake content) associated with an executive of an entity (e.g., a chief operating officer (CEO) may be assigned a higher weight than threats including content associated with a lesser-known individual (e.g., a relatively unknown individual using the Internet such a member of a public blog/forum that have only one post on the public blog/forum). The assigned weight (e.g., a value based on a scale of 0-100 where a value of 0 may indicate "no threat", a value between 1-50 may indicate "low priority", and a value of 51-100 may indicate "high priority"; other schemas and ranges of values may be used without departing from the scope of one or more embodiments disclosed herein).

In some embodiments, the assigned weights may be determined using a rules engine configured based on a predetermined set of rules (e.g., a set of rules stored in memory 204) and/or using one or more self-learning computing models configured for the threat priority engine 210 (e.g., the same and/or different self-learning computing models from the self-learning computing models configured for the threat identification engine 208) that may be trained to assign weights based provided data (e.g., historical data such as historical deepfake data).

Although specific methods (e.g., assignment of a weight) are described above for determining a priority of each identified threat, a person having ordinary skill in the art would appreciate that other known methods and techniques for establishing a level of priority could be used without departing from the scope of one or more embodiments disclosed herein.

In some embodiments, Operation 306 may be optional. Said another way, all threats identified in Operation 304 would be treated equally with the same priority and the flowchart may direct proceed from Operation 304 to Operation 308 while skipping Operation 308.

Finally, as shown by Operation 308, the apparatus 200 includes means, such as processor 202, memory 204, communications hardware 206, remediation engine 212, or the like for causing execution of one or more threat remediation actions.

In some embodiments, the threat remediation action may include, but is not limited to, at least one of: publishing an emergency remediation statement addressing the threat, transmitting a takedown request to remove the threat from a threat source (e.g., the threat source 110 of FIG. 1), generating an internal warning and/or notification, and/or ignoring the threat.

In some embodiments, the threat remediation action(s) that are executed (e.g., by the remediation engine 212) may be chosen based on the weight of the threat (e.g., the weight assigned in Operation 306). Alternatively, if Operation 306 was omitted (e.g., all threats are treated equally with the same priority, the remediation engine 212 may be configured to execute the same one(s) of the threat remediation action(s) (e.g., as a standard threat remediation protocol set up by a user).

In some embodiments, the remediation engine 212 may be configured with a trained generative artificial intelligence (GAI) model that automatically generates the emergency remediation statement, the takedown request, and/or the internal warning and/or notification. The trained GAI model may be trained using historical examples of each of these outputs such that the trained GAI model may be able to automatically (without use intervention) generate unique ones of these outputs in each instance where one of these outputs is required. Said another way, and as one example, each generated emergency remediation statement may be unique (e.g., different) from one another based on, for example, one or more information associated with the threat (e.g., the name of the threat source, the content of the threat, the type of the threat, etc.).

In some embodiments, the emergency remediation statement may be generated as text (e.g., a blog post, digital letter, digital notification, or the like), as audio (e.g., a speech), as video including synthetic visual and audio components generated by the trained generative artificial intelligence. The emergency remediation statement may be generated in other forms (e.g., other digital formats) not described above without departing from the scope of one or more embodiments disclosed herein.

In some embodiments, the emergency remediation statement may be generated as a temporary solution for remediating the threat until a more proper and formal solution can be implemented by a human user. For example, the emergency remediation statement may include, as part of the statement, an indication that a supplemental remediation statement (discussed below) will be issued in due course. As one example, the emergency remediation statement may be: "This content is not associated with, affiliated with, and/or endorsed by [entity name]. A statement with more detail with regard to this matter will be released by [entity name] shortly."

In some embodiments, in an instance where the threat remediation action(s) include the publishing of the emergency remediation statement and/or the takedown request, the remediation engine 212 is configured to generate (using the above-discussed techniques) the emergency remediation statement and/or the takedown request without human intervention using the trained GAI model. Once the emergency remediation statement and/or the takedown request is generated, the remediation engine 212 may immediately (e.g., instantly upon completion of generation of emergency remediation statement and/or the takedown request) and automatically (again without any human intervention) cause publication of the generated emergency remediation statement and/or transmission of the takedown request (e.g., using communications hardware 206) to one on or more online sources. The one or more online sources on which the emergency remediation statement is published (and/or that the takedown request is transmitted to) may include, but is not limited to: a website operated by an entity associated with (e.g., operating) the apparatus 200), one or more third-part content sharing websites, one or more websites associated with the threat source (e.g., threat source 110 of FIG. 1) (e.g., threat source from which the piece of data is obtained), or the like.

In some embodiments, similar to the remediation statement, the takedown request may also be generated as a preliminary takedown request and one or more supplemental takedown requests. In some embodiments, the main purpose of the preliminary takedown request is to again apply an immediate (albeit sometimes incomplete) remedy to reduce additional harm from being caused to the entity as a result of one or more delays from addressing the threat. In contrast, the main purpose of the supplemental takedown request(s) may be to supplement any information (e.g., jurisdictional information, legal information, or the like) that could have been missing or incomplete from the preliminary takedown request in order to build on and bolster the effects of the preliminary takedown request.

In some embodiments, each of the takedown requests (including both the preliminary and subsequent takedown requests) may include more than one takedown target including a primary takedown target and one or more secondary takedown targets. The primary takedown target may be the piece of data obtained in Operation 302 while the secondary takedown targets may be one or more other pieces of data (e.g., media content) from a same source as the primary takedown target that are identified using one or more threat fingerprints generated based on (e.g., using) the primary takedown target. Said another way, the primary takedown target may reveal certain information (e.g., patterns, impressions, or the like) that could be used to identify other similar threats from the same source. This advantageously allows all other potential threats to be identified (e.g., by the threat identification engine 208) and proactively removed before these potential threats become an issue for (e.g., cause damage or additional damage to) the entity and/or the individual (or for other entities and individuals).

In some embodiments, a timing at which the emergency remediation statement and/or the takedown request are caused to be automatically published on/transmitted to the one or more online sources may be based on the weight of the threat. For example, if the weight indicates that the threat is a high-priority threat (e.g., the threat is assigned a higher weight value), the publication/transmission may be caused immediately (as discussed in the above example) by the remediation engine 212 in order to reduce the amount of potential (or actual damage) caused by the threat to the entity as each second passes by without the publication/transmission of the emergency remediation statement and/or takedown request. As another example, if the weight indicates that the threat is of lower priority (e.g., the threat is assigned a lower weight value), the remediation engine 212 may be configured to wait a predetermined amount of time (e.g., based on a predetermined set of rules) before causing publication/transmission of the emergency remediation statement and/or takedown request.

In some embodiments, if the threat is not assigned a weight (e.g., Operation 306 was omitted), the timing at which the emergency remediation statement and/or the takedown request is caused to be automatically published/transmitted by the remediation engine 212 may be standardized (e.g., based on a standard timing value set by a user). The standard timing value may be any value ranging from immediate publication/transmission to any amount of time greater than the amount of time required for an immediate publication/transmission (e.g., 0.00001 seconds, 0.001 seconds, 1 second, or the like).

In some embodiments, the remediation engine 212 may also generate a threat notification whenever an emergency radiation statement and/or a takedown request is generated. The threat notification may include instructions for an entity associated with the apparatus 200 to generate a supplemental remediation statement to supplement (e.g., follow) the emergency remediation statement. The threat notification may also include instructions for the entity associated with the apparatus 200 to monitor the status/activity of the transmitted takedown request such that the entity may take additional action should the initial takedown request fail or is insufficient. In some embodiments, the threat notification may also include information such as: an indication of which threat remediation action(s) were taken; a content of any generated emergency remediation statements and/or takedown requests; information about the threat source; information about the threat (including the threat itself), a weight of the threat (if one is generated in Operation 306); recommendations for supplemental actions for addressing/remediating the threat; and/or any other relevant information that would allow the entity to take appropriate action to address the threat. In some embodiments, the remediation engine 212 may cause the threat notification to be displayed (e.g., using the input-output circuitry of communications hardware 206 such as a display (e.g., a computer monitor)) to one or more individuals associated with the entity (e.g., a user and/or an administrator of the apparatus 200).

In one or more embodiments, both of the preliminary remediation statement (even though it is generated without any intervention by any humans associated with the entity and/or individual) and the supplemental remediation statement are official statements issued by the entity and/or individual. The main purpose of the preliminary remediation statement is to inform the public within the least amount of time since discovery/identification of the threat that the threat includes fake content (e.g., deepfake content) that is not made by the entity. This advantageously reduces any amount of potential and/or actual damage caused by the threat toward the entity, and reduces the possibility of any irreparable harm being caused as a result of not immediately addressing the threat (e.g., because the entity is short-staffed, because there are too many simultaneously occurring threats such that it is humanly impossible to immediately address each and every one of the simultaneously occurring threats, delays caused by human error in identifying and/or assessing the threats, or the like). On the other, the main purpose of the supplemental remediation statement is to allow a human to supplement any additional information (e.g., details missed by the trained GAI model, details unknown to the trained GAI model, or the like) in order to present a more complete and detailed explanation as to how the content of the threat includes false information and is not associated (e.g., generated by, endorsed by, affiliated with, or the like) with the entity in any ways.

In some embodiments, the threat notification may also include instructions for the entity to generate and/or implement one or more internal policies (e.g., data compliance policy, data security policy, data security training, or the like) in order to alleviate future damages caused by similar threats (e.g., phishing emails including deepfake content, or the like).

In some embodiments, the apparatus 200 may receive (e.g., via communications hardware 206) the supplemental remediation statement from the entity. Upon receiving the supplemental remediation statement, the remediation engine 212 may be configured to automatically cause publication of the supplemental remediation statement on the same ones of the one or more online sources on which the emergency remediation statement was previously published.

FIG. 3 illustrates operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable improved detection, assessment, and mitigation of online/cyber-related threats. Example embodiments thus provide tools that overcome the problems faced by individuals and/or entities that are subject to said online/cyber-related threats. For example, by avoiding the need to manually identify, assess, and mitigate each threat and/or potential threat (which could be up to hundreds to tens of thousands of threats per minutes), example embodiments thus advantageously reduce potential damages caused (or already caused) by such threats before a human is available to manually intervene. Moreover, embodiments described herein automates the generation of emergency actions (e.g., generation of the emergency statement, take down requests, internal warnings/notifications, or the like), which is a functionality that has historically required human analysis and input. Such automation unlocks many potential new functions that have historically not been available, such as the ability to conduct near-real-time remediation and alleviation of such online/cyber-related threats that conventionally could take significantly longer (e.g., potentially up to 10 to 100 times longer) to manually remediate and alleviate, by which time irreparable damages could already have been suffered by the individuals and/or entities targeted by said threats.

As these examples all illustrate, example embodiments contemplated herein provide technical solutions that solve real-world problems faced during normal use of the Internet (e.g., normal use of digital communications and digital information sharing). And while online and cyber-related threats have been an issue for decades, the recently exploding amount of data made available by recently emerging technology today (e.g., AI) has made this problem significantly more acute (e.g., through the use of deepfake and other AI related techniques). At the same time, the recently arising ubiquity of the above-discussed issues involving online/cyber-related threats has unlocked new avenues to solving this problem that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   obtaining, via communications hardware of a threat manager, a piece of data;
   determining, by a threat identification engine of the threat manager, that the piece of data is a threat; and
   causing, by a remediation engine of the threat manager and based on the determination, execution of a threat remediation action,
   wherein the threat remediation action comprises publishing an emergency remediation statement addressing the threat and transmitting a takedown request to remove the threat from a threat source, wherein causing execution of the threat remediation action further comprises:
   generating, by the remediation engine, the takedown request without human intervention using a generative artificial intelligence (GAI) model, wherein the takedown request is generated in addition to the emergency remediation statement and the takedown request indicates (i) a primary takedown target that is the piece of data that comprises deepfake content that is adverse to an entity associated with the threat manager, and the threat source is a third-party content-sharing website, and (ii) one or more secondary takedown targets comprising other pieces of data identified using a threat fingerprint generated, by the threat identification engine, using at least the piece of data; and automatically transmitting, by the communications hardware, the takedown request to the threat source from which the piece of data is obtained.

2. The method of claim 1, further comprising:

assigning, by a threat priority engine of the threat manager, a weight to the threat, wherein the threat remediation action that is executed is chosen based on the weight of the threat.

3. The method of claim 2, wherein causing execution of the threat remediation action further comprises:

generating, by the remediation engine, the emergency remediation statement without human intervention using a trained generative artificial intelligence (GAI) model; and causing, by the remediation engine, automatic publication of the emergency remediation statement on one or more online sources.

4. The method of claim 3, wherein the one or more online sources comprises a website operated by an entity associated with the threat manager and one or more third-party content-sharing websites.

5. The method of claim 4, wherein the piece of data contains deepfake content comprising one or more of a video file or an audio file associated with the entity.

6. The method of claim 3, wherein a timing at which the emergency remediation statement is caused to be automatically published on the one or more online sources is based on the weight of the threat.

7. The method of claim 3, wherein causing execution of the threat remediation action further comprises:

generating, by the remediation engine and after the publication of the emergency remediation statement, a threat notification; and causing, by the remediation engine, display of the threat notification to an entity associated with the threat manager, wherein the threat notification comprises instructions for generating a supplemental remediation statement to supplement the emergency remediation statement.

8. The method of claim 7, further comprising:

receiving, via communications hardware, the supplemental remediation statement; and automatically causing, by the remediation engine, publication of the supplemental remediation statement on the one or more online sources on which the emergency remediation statement was published.

9. A threat manager apparatus comprising:

communications hardware configured to obtain a piece of data;

a threat identification engine configured to determine whether the piece of data is a threat; and a remediation engine configured to execute, based on the threat identification engine determining that the piece of data is a threat, a threat remediation action, wherein the threat remediation action comprises publishing an emergency remediation statement addressing the threat and transmitting a takedown request to remove the threat from a threat source, wherein execution of the threat remediation action further comprises:

generating, by the remediation engine, the takedown request without human intervention using a generative artificial intelligence (GAI) model, wherein the takedown request is generated in addition to the emergency remediation statement and the takedown request indicates (i) a primary takedown target that is the piece of data that comprises deepfake content that is adverse to an entity associated with the threat manager apparatus, and the threat source is a third-party content-sharing website, and (ii) one or more secondary takedown targets comprising other pieces of data identified using a threat fingerprint generated, by the threat identification engine, using at least the piece of data; and automatically transmitting, by the communications hardware, the takedown request to the threat source from which the piece of data is obtained.

10. The threat manager apparatus of claim 9, further comprising:

a threat priority engine configured to assign a weight to the threat, wherein the threat remediation action that is executed by the remediation engine is chosen based on the weight of the threat assigned by the threat priority engine.

11. The threat manager apparatus of claim 10, wherein causing execution of the threat remediation action further comprises, by the remediation engine:

generating the emergency remediation statement without human intervention using a trained generative artificial intelligence (GAI) model; and causing automatic publication of the emergency remediation statement on one or more online sources.

12. The threat manager apparatus of claim 11, wherein the one or more online sources comprises a website operated by an entity associated with the threat manager apparatus and one or more third-party content-sharing websites.

13. The threat manager apparatus of claim 12, wherein the piece of data contains deepfake content comprising one or more of a video file or an audio file associated with the entity.

14. A computer program product comprising at least one non-transitory computer-readable storage medium storing software instructions that, when executed, cause a threat manager to:

obtain a piece of data;

determine that the piece of data is a threat; and cause, based on the determination, execution of a threat remediation action, wherein the threat remediation action comprises publishing an emergency remediation statement addressing the threat and transmitting a takedown request to remove the threat from a threat source, wherein causing execution of the threat remediation action further comprises:

generating the takedown request without human intervention using a generative artificial intelligence (GAI) model, wherein the takedown request is generated in addition to the emergency remediation statement and the takedown request indicates (i) a primary takedown target that is the piece of data that comprises deepfake content that is adverse to an entity associated with the threat manager, and the threat source is a third-party content-sharing website, and (ii) one or more secondary takedown targets comprising other pieces of data identified using a threat fingerprint generated using at least the piece of data; and automatically transmitting the takedown request to the threat source from which the piece of data is obtained.

15. The computer program product of claim 14, wherein the threat manager is further caused to:
assign a weight to the threat, wherein the threat remediation action that is executed is chosen based on the weight of the threat.

16. The computer program product of claim 15, wherein causing execution of the threat remediation action further comprises:
generating the emergency remediation statement without human intervention using a trained generative artificial intelligence (GAI) model; and
causing automatic publication of the emergency remediation statement on one or more online sources.

17. The computer program product of claim 16, wherein the one or more online sources comprises a website operated by an entity associated with the threat manager and one or more third-party content-sharing websites.

18. The computer program product of claim 17, wherein the piece of data contains deepfake content comprising one or more of a video file or an audio file associated with the entity.

19. The computer program product of claim 16, wherein causing execution of the threat remediation action further comprises:
generating, after the publication of the emergency remediation statement, a threat notification; and
causing display of the threat notification to an entity associated with the threat manager, wherein the threat notification comprises instructions for generating a supplemental remediation statement to supplement the emergency remediation statement.

20. The computer program product of claim 19, wherein the threat manager is further caused to:
receiving the supplemental remediation statement; and
automatically causing publication of the supplemental remediation statement on the one or more online sources on which the emergency remediation statement was published.

\* \* \* \* \*